(12) United States Patent
Veloso et al.

(10) Patent No.: US 11,601,542 B1
(45) Date of Patent: Mar. 7, 2023

(54) CRASH DETECTION SYSTEM COMPRISING A MICROPHONE, FIRST AND SECOND BATTERIES, AND FIRST AND SECOND ANTENNAS AND A METHOD OF OPERATING THE SAME

(71) Applicant: GM Global Technology Operations LLC, Detroit, MI (US)

(72) Inventors: Alex Jose Veloso, Rochester Hills, MI (US); Mateus Amstalden Santa Rosa, West Bloomfield, MI (US); Russell A. Patenaude, Macomb Township, MI (US); Matthew Edward Gilbert-Eyres, Rochester, MI (US); Dipankar Pal, Sylvania, OH (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/481,619

(22) Filed: Sep. 22, 2021

(51) Int. Cl.
| | |
|---|---|
| *H04M 1/72421* | (2021.01) |
| *H04W 76/50* | (2018.01) |
| *H04M 1/60* | (2006.01) |
| *H04W 4/02* | (2018.01) |
| *G08G 1/16* | (2006.01) |

(52) U.S. Cl.
CPC ........ *H04M 1/72421* (2021.01); *G08G 1/164* (2013.01); *H04M 1/6075* (2013.01); *H04W 4/027* (2013.01); *H04W 76/50* (2018.02); *H04M 2201/40* (2013.01)

(58) Field of Classification Search
CPC .......... H04M 1/72421; H04M 1/6075; H04M 2201/40; H04W 4/027; H04W 76/50; G08G 1/164

USPC .......... 455/99, 152.1, 404.1–404.2, 412.2, 414.1, 455/569.2, 575.9
See application file for complete search history.

(56) References Cited

U.S. PATENT DOCUMENTS

| | | | |
|---|---|---|---|
| 4,558,459 A * | 12/1985 | Noso ............ | G10L 15/20 704/E11.005 |
| 6,433,697 B1 * | 8/2002 | Brisse ............ | H02J 9/061 320/112 |
| 2006/0192658 A1 * | 8/2006 | Yamamura ....... | B60R 25/302 348/148 |
| 2012/0094628 A1 * | 4/2012 | Mader ............ | B60R 21/0136 455/404.1 |

(Continued)

*Primary Examiner* — Michael Y Mapa
(74) *Attorney, Agent, or Firm* — Vivacqua Crane PLLC

(57) ABSTRACT

A crash detection system for a vehicle comprises first and second batteries and a computational system comprising a processor and a non-transitory computer-readable medium. First and second antennas are both in electronic communication with the computational system and powered by one of the batteries, with the antennas configured to independently wirelessly communicate with an external network. A microphone powered by one of the batteries and in electronic communication with the computational system. The microphone continuously receives sound waves in real time and transmits sound signals to the processor. The processor monitors properties of the sound waves within the sound signals, compares the properties to thresholds stored in the non-transitory computer-readable medium, determines if the vehicle has been involved in a collision if at least one of the properties crosses the respective threshold, and communicates with the external network to report the collision with one of the antennas.

16 Claims, 7 Drawing Sheets

(56) References Cited

U.S. PATENT DOCUMENTS

2014/0049406 A1* 2/2014 Shin ................... G08G 1/0112
                                                340/905
2020/0118367 A1* 4/2020 Dudar .................... F02D 41/22
2022/0009438 A1* 1/2022 Schaller ............... B81B 7/0061

* cited by examiner

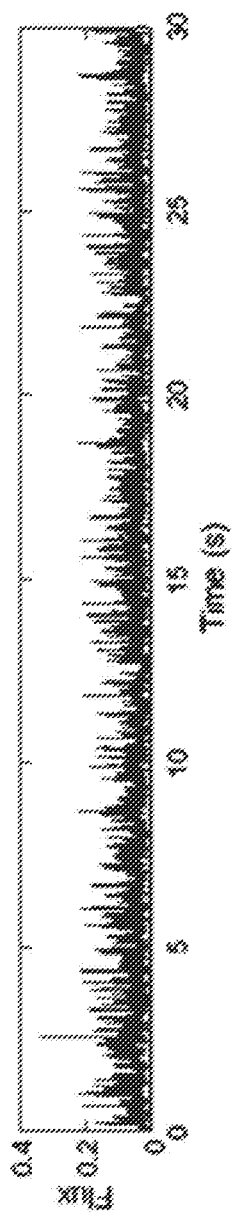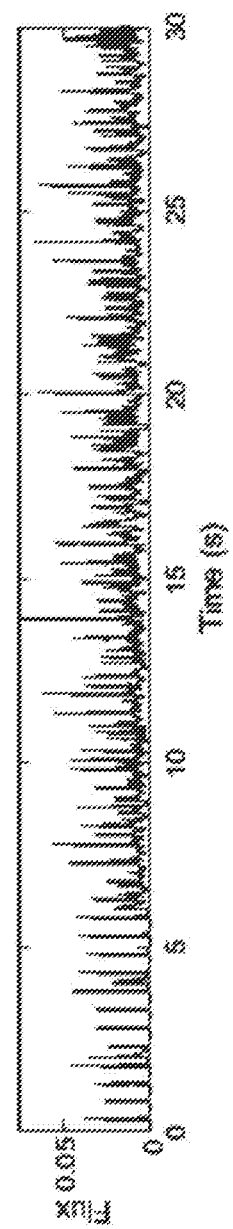
FIG. 3
FIG. 4

CRASH DETECTION SYSTEM COMPRISING A MICROPHONE, FIRST AND SECOND BATTERIES, AND FIRST AND SECOND ANTENNAS AND A METHOD OF OPERATING THE SAME

INTRODUCTION

The present disclosure relates to a crash detection system for use with a vehicle, and more particularly to a crash detection system for use with a vehicle that utilizes a microphone, first and second batteries, and first and second antennas, and a method of operating the same.

Current crash detection systems in vehicles rely upon data from electronic sensors (i.e., accelerometers, pressure sensors, etc.) or acceleration data from communication with a global navigation satellite system (GNSS) network to trigger an emergency response call. However, communication between the electronic sensors (spaced about the vehicle) and a processor may fail over time due to wear or during a collision due to the forces exerted on the vehicle. Likewise, a vehicle may lose communication with GNSS network by being out of view of the satellites (i.e., within a tunnel, next to a large building or mountains, etc.) reducing the chances to use GNSS data as a collision detection method. As such, a vehicle may be unable to trigger an emergency response call in the event of a collision.

Thus, while existing crash detection systems achieve their intended purpose, there is a need for a new and improved crash detection system that addresses these issues.

SUMMARY

According to several aspects of the present disclosure, a crash detection system for use with a vehicle is provided. The crash detection system comprises a first battery and a second battery, a computational system powered by one of the first and second batteries and comprising at least one processor and at least one non-transitory computer-readable medium including instructions, a first antenna and a second antenna both in electronic communication with the computational system and powered by one of the first and second batteries, with the first and second antennas configured to independently wirelessly communicate with an external network. The crash detection system further comprises a microphone powered by one of the first and second batteries and in electronic communication with the computational system. The microphone is configured to continuously receive sound waves in real time and transmit sound signals corresponding to the sound waves to the processor. The processor is programmed to monitor properties of the sound waves within the sound signals, compare the properties to thresholds stored in the at least one non-transitory computer-readable medium, determine if the vehicle has been involved in a collision if at least one of the properties crosses the respective threshold, and communicate with the external network to report the collision with one of the first and second antennas.

In one aspect, the first battery is further defined as a vehicle battery configured to power the entire vehicle and the first antenna is further defined as a vehicle cellular antenna configured to provide wireless communication with the external network for the entire vehicle. The second battery and the second antenna are further defined as a backup battery and a backup cellular antenna, respectively, and independently connected to the computational system. The backup battery is configured to power the computational system if power from the vehicle battery is lost from the computational system. The backup cellular antenna is configured to provide wireless communication with the external network for the computational system if the electronic communication between the computational system and the vehicle cellular antenna is lost.

In another aspect, the processor being programmed to monitor the properties of the sound waves within the sound signals is further defined as the processor being programmed to monitor at least one of a gradient of a variance of the sound wave, a spectral flux of the sound wave, and a cross correlation analysis.

In another aspect, the microphone is further defined as an occupant microphone, with the sound waves comprising at least speech from an occupant of the vehicle and collision sounds.

In another aspect, the processor is programmed to adjust a gain of the microphone, with the processor lowering the gain to receive the sound waves of the collision sounds and increasing the gain to receive the sound waves of the speech.

In another aspect, the crash detection system further comprises a primary collision indication system comprising at least one of an accelerometer and a navigation system and configured to detect acceleration of the vehicle, with the primary collision indication system in communication with the computational system and powered by one of the first and second batteries, and with the primary collision indication system configured to send primary signals to the computational system pertaining to the acceleration of vehicle. The processor is programmed to prioritize the primary signals over the sound signals, monitor the acceleration of the vehicle within the primary signals, compare the acceleration to an acceleration threshold stored in the at least one non-transitory computer-readable medium, determine if the vehicle has been involved in a collision if the acceleration crosses the respective acceleration threshold, and communicate with the external network to report the collision with one of the first and second antennas.

In another aspect, the processor is further programmed to determine if the primary signals are present, prioritize the sound signals if the primary signals are not present, and monitor the properties of the sound waves within the sound signals.

In another aspect, the first antenna is prioritized to wirelessly communicate with the external network and the first battery is prioritized to provide power to the first antenna, the primary collision indication system, the microphone, and the computational system. The second battery powers the first antenna, the primary collision indication system, the microphone, and the computational system if power is lost from the first battery. The first battery powers the second antenna, the primary collision indication system, the microphone, and the computational system if electronic communication between the computational system and the first antenna is lost. The second battery powers the second antenna, the microphone, and the computational system if power is lost from the first battery and electronic communication between the computational system and the first antenna is lost.

In another aspect, the navigation system comprises a navigation antenna in electronic communication with the computational system, with the navigation antenna configured to wirelessly communicate with a global navigation satellite system (GNSS) network.

In another aspect, the processor of the computational system is further programmed to communicate with the GNSS network through the navigation antenna to ascertain a location of the vehicle, calculate an acceleration of the vehicle through a change in the location relative to time, compare the acceleration to an acceleration threshold stored in the at least one non-transitory computer-readable medium, determine if the vehicle has been involved in a collision if the acceleration crosses the respective acceleration threshold, and communicate with the external network to report the collision.

According to several aspects of the present disclosure, a method of operating a crash detection system for use with a vehicle is provided, with the crash detection system comprising a first battery and a second battery and a computational system powered by one of the first and second batteries. The computation system comprises at least one processor and at least one non-transitory computer-readable medium including instructions. The crash detection system further comprises a first antenna and a second antenna both in electronic communication with the computational system and powered by one of the first and second batteries. The crash detection system further comprises a microphone powered by one of the first and second batteries and in electronic communication with the computational system. The method comprises receiving sound waves continuously and in real time with the microphone, transmitting sound signals corresponding to the sound waves to the processor, monitoring properties of the sound waves within the sound signals with the processor, comparing the properties to thresholds stored in the at least one non-transitory computer-readable medium, determining if the vehicle has been involved in a collision if at least one of the properties crosses the respective threshold, communicating wirelessly with an external network with one of the first and second antenna, and reporting the collision to the external network.

In one aspect, monitoring properties of the sound waves within the sound signals with the processor is further defined as monitoring at least one of a gradient of a variance of the sound wave, a spectral flux of the sound wave, and a cross correlation analysis within the sound signals with the processor.

In another aspect, the method further comprises adjusting a gain of the microphone to accommodate the sound waves, after receiving the sound waves with the microphone.

In another aspect, the microphone is further defined as an occupant microphone, with the sound waves comprising speech from an occupant of the vehicle and collision sounds. The method of adjusting a gain of the microphone to accommodate the sound waves is further defined as lowering the gain to receive the sound waves of the collision sounds and increasing the gain to receive the sound waves of the speech.

In another aspect, the crash detection system further comprises a primary collision indication system comprising at least one of an accelerometer and a navigation system, with the primary collision indication system in communication with the computational system and configured to send primary signals to the computational system pertaining to the acceleration of the vehicle. The method further comprises detecting an acceleration of the vehicle with the primary collision indication system, sending primary signals to the computational system pertaining to the acceleration of vehicle, prioritizing the primary signals over the sound signals with the processor, monitoring the acceleration of the vehicle within the primary signals with the processor, comparing the acceleration to an acceleration threshold stored in the at least one non-transitory computer-readable medium with the processor, determining if the vehicle has been involved in a collision if the acceleration crosses the respective acceleration threshold with the processor, communicating wirelessly with the external network with one of the first and second antennas, and reporting the collision to the external network.

In another aspect, the method further comprises determining if the primary signals are present with the processor, prioritizing the sound signals if the primary signals are not present with the processor, and monitoring the properties of the sound waves within the sound signals with the processor.

In another aspect, the method further comprises determining if electronic communication with the first antenna is available and communicating wirelessly with an external network with the second antenna if the first antenna is not available.

In another aspect, the method further comprises powering the first antenna, the primary collision indication system, the microphone, and the computational system with the first battery, losing continuity with the first battery, and powering the first antenna, the microphone, and the computational system with the second battery.

According to several aspects of the present disclosure, a method of operating a crash detection system for use with a vehicle is provided. The crash detection system comprises a first battery and a second battery, a computational system comprising at least one processor and at least one non-transitory computer-readable medium including instructions, a first antenna and a second antenna both in electronic communication with the computational system and powered by one of the first and second batteries, and a microphone in electronic communication with the computational system. The method comprises powering the first antenna, the primary collision indication system, the microphone, and the computational system with the first battery, losing continuity with the first battery, powering the first antenna, the microphone, and the computational system with the second battery, receiving sound waves continuously and in real time with the microphone, adjusting a gain of the microphone to accommodate the sound waves, transmitting sound signals corresponding to the sound waves to the processor, monitoring properties of the sound waves within the sound signals with the processor, comparing the properties to thresholds stored in the at least one non-transitory computer-readable medium, determining if the vehicle has been involved in a collision if at least one of the properties crosses the respective threshold, communicating wirelessly with an external network with the first antenna, and reporting the collision to the external network.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a line graph showing an example of a spectral flux of a 500 Hz sine sound wave received by the crash detection system.

FIG. 4 is a line graph showing an example of a spectral flux of a sound wave from a song, received by the crash detection system.

DETAILED DESCRIPTION

The following description is merely exemplary in nature and is not intended to limit the present disclosure, application, or uses.

Figure 1:
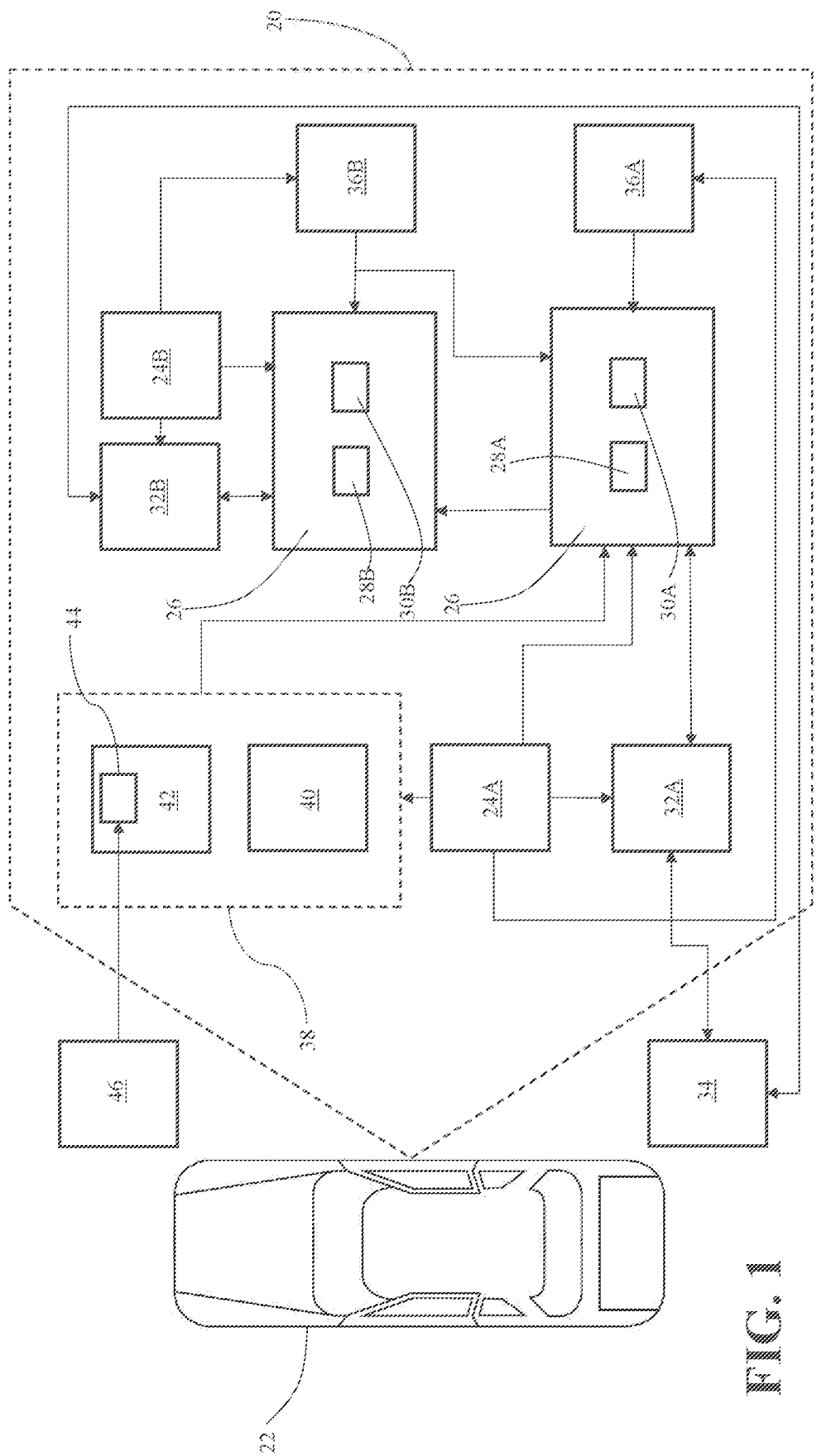
FIG. 1 is a schematic view of one example of a vehicle having a crash detection system.

Referring to FIG. 1, according to several aspects of the present disclosure, a crash detection system 20 for use with a vehicle 22 is generally shown. In the example shown in FIG. 1, the vehicle 22 is an automobile. However, the crash detection may be utilized in a variety of industries, such as heavy truck, construction, agricultural, etc. The crash detection system 20 comprises a first battery 24A and a second battery 24B and a computational system 26 powered by one of the first and second batteries 24A, 24B and comprising at least one processor 28 and at least one non-transitory computer-readable medium 30 including instructions. The crash detection system 20 further comprises a first antenna 32A and a second antenna 32B both in electronic communication with the computational system 26 and powered by one of the first and second batteries 24A, 24B. The first and second antennas 32A, 32B are configured to independently wirelessly communicate with an external network 34. In the example shown in the figures, the first and second antennas 32A, 32B are configured as cellular antennas. However, the first and second antennas 32A, 32B may be configured for use with any suitable wireless communication protocol.

The crash detection system 20 further comprises a microphone 36 powered by one of the first and second batteries 24A, 24B and in electronic communication with the computational system 26. The microphone 36 is configured to continuously receive sound waves in real time and transmit sound signals corresponding to the sound waves to the processor 28. The microphone 36 may be configured to be open and continuously receive the sound waves and transmit the sound signals to the processor 28. During a collision, sounds are generated due to the force of the impact and the dispersion of energy through the vehicle 22. The processor 28 is programmed to monitor properties of the sound waves within the sound signals, compare the properties to thresholds stored in the at least one non-transitory computer-readable medium 30, determine if the vehicle 22 has been involved in a collision if at least one of the properties crosses the respective threshold, and communicate with the external network 34 to report the collision with one of the first and second antennas 32A, 32B. More specifically, the microphone 36 receives the sound continuously and in real time, and the processor analyzes and compares the sound with the thresholds (e.g., pre-learned crash sound curves) to detect the collision. In one example, the microphone 36 is positioned internally within the vehicle 22 (i.e., in the passenger compartment). However, the microphone 36 may be positioned externally, such as along an exterior surface of the vehicle 22, within the engine compartment, etc. The external network 34 may be an emergency services network (such as OnStar®) which receives the communication from the crash detection system 20 and then contacts the appropriate emergency response team (e.g., fire department, police, ambulance) that can provide assistance to occupants of the vehicle 22. Alternatively, the external network 34 may be a local emergency services operator (i.e., 911) or a direct connection to the emergency response team.

The communication from the crash detection system 20 to the external network 34 may be an electronic signal interpreted by a processor of the external network 34 that indicates a collision has occurred. Alternatively, the communication with the external network 34 may be a direct connection to the microphone 36, such that the external network 34 may hear what is happening in and/or around the vehicle 22, such as a voice conversation with the occupant(s) of the vehicle 22 supported by the same microphone 36 used to detect the collision sound.

In one example, the microphone 36 is further defined as an occupant microphone, with the sound waves comprising at least speech from an occupant of the vehicle 22 and collision sounds. More specifically, the occupant microphone may be the same microphone that is used for hands-free cellular communication by the occupant of the vehicle 22. As such, the same microphone adopted for regular conversation will be used to capture the sound propagated during the collision. In another example (not shown), the microphone 36 is a component of a cellular phone of the occupant that is connected to the vehicle (either wirelessly or through a wired connection). The microphone 36 is separate and distinct from any microphone used to receive speech from the occupant. The processor 28 may be programmed to adjust a gain of the microphone 36. More specifically, the gain required for receiving regular speech versus sounds propagated during the collision may be different. Low gains will allow lower harmonic distortions in the collision audio but jeopardize a regular conversation. As such, the processor 28 may lower the gain to receive the sound waves of the collision sounds and may increase the gain to receive the sound waves of the speech. If the microphone 36 is in use for a conversation when a collision happens, the call will not be interrupted. Instead, a message will be transmitted to the external network 34 indicating a collision may have happened if the captured sounds (even with the increased gain) indicate a collision has occurred.

Figure 2:
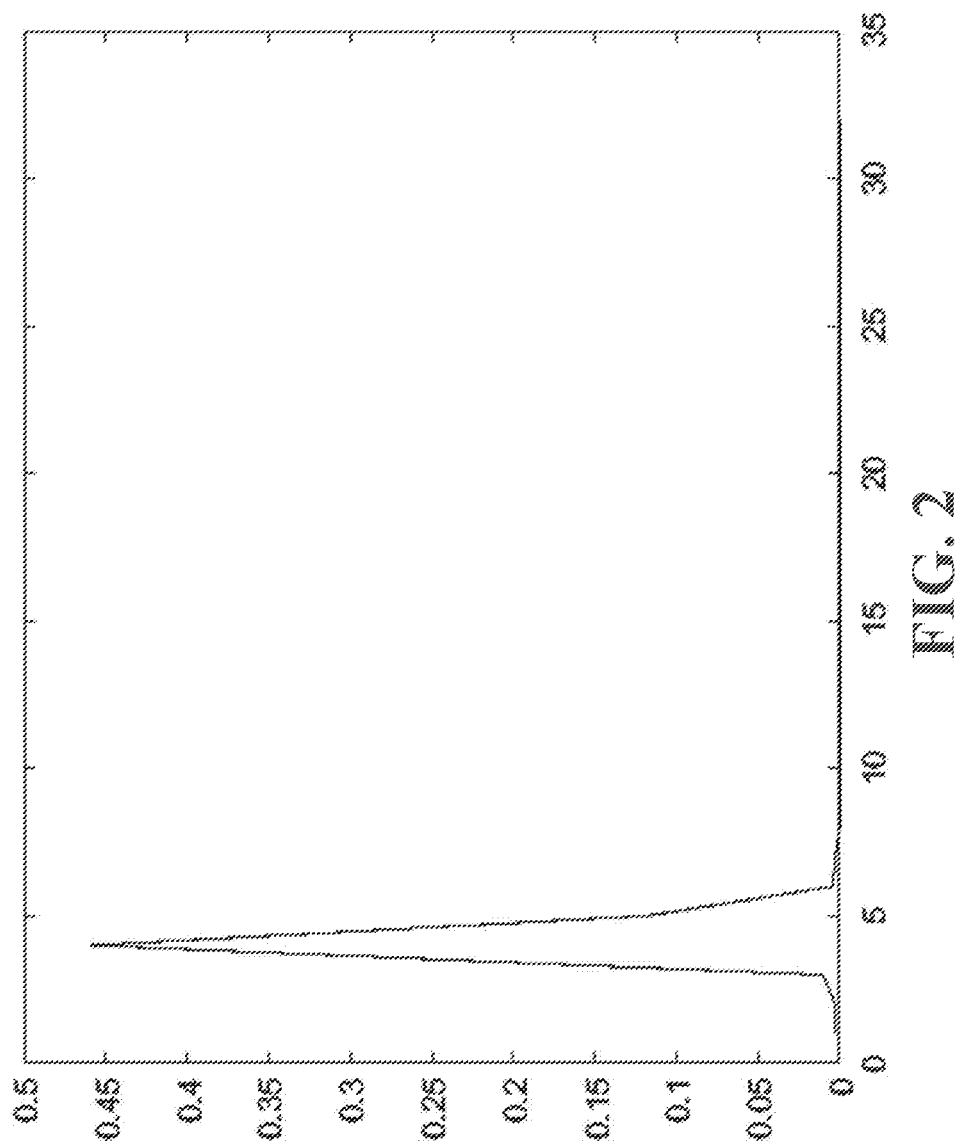
FIG. 2 is a line graph showing an example of a gradient of a variance of a sound wave received by the crash detection system within a time period.

The processor 28 being programmed to monitor the properties of the sound waves within the sound signals may be further defined as the processor 28 being programmed to monitor at least one of a gradient of a variance of the sound wave, a spectral flux of the sound wave, and a cross correlation analysis. More specifically, to characterize the sound signal as one that has a pattern indicative of a collision, at least one of the gradient of the variance of the sound wave, the spectral flux of the sound wave, and the cross-correlation analysis may be utilized. The gradient of the variance within a window limited for a certain period of time facilitates the identification of sudden peaks as a function of the time, which happen during a collision within the time domain. One example of a gradient of the variance within a time period and indicative of a collision is shown in the graph of FIG. 2. Regular sounds coming from a conversation or from a song has a variance within a certain range which is kept over time. However, when a collision sound happens, the variance increases suddenly and keeps high (in one example, for approximately six seconds). The processor 28 may be programmed to compare how the variance range is behaving within the time domain.

Figure 5:
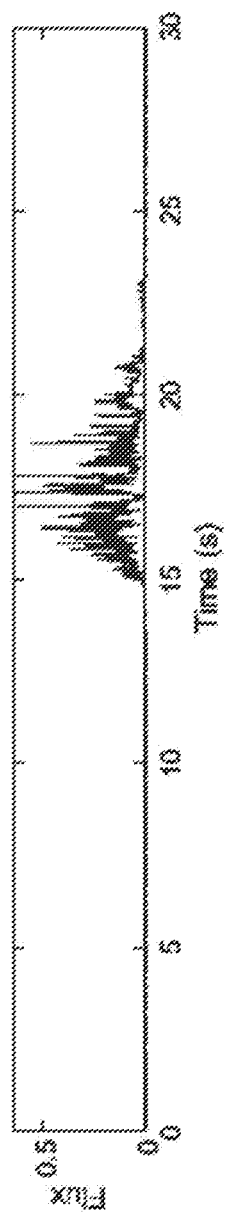
FIG. 5 is a line graph showing an example of a spectral flux of a sound wave from a 32 kph vehicle collision, received by the crash detection system.
Figure 6:
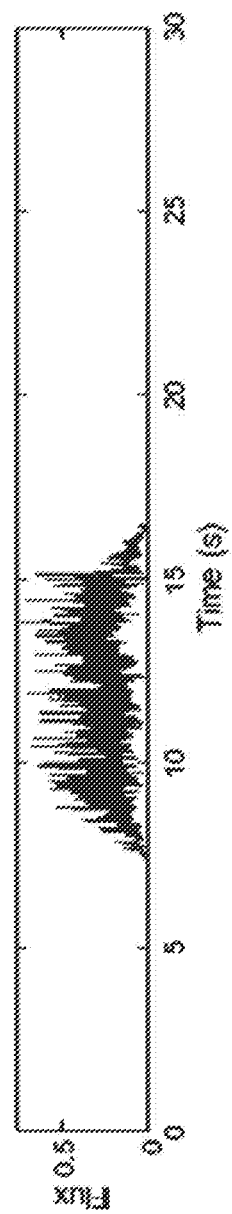
FIG. 6 is a line graph showing an example of a spectral flux of a sound wave from a 56 kph vehicle collision, received by the crash detection system.

In order to detect sudden changes in the spectrum over time, the spectral flux may be calculated to identify abrupt changes in the frequency domain, which happen during a collision. As demonstrated in FIGS. 3-6, non-percussive sounds can be distinguished from spectral flux analysis. More specifically, FIG. 3 shows the spectral flux of 500 Hz sine wave. FIG. 4 shows the spectral flux of a song (more specifically, a song of the "metal" genre). FIG. 5 shows the spectral flux of a vehicle in a 32 kph collision. FIG. 6 shows the spectral flux of a vehicle in a 56 kph collision. The differences between the spectral fluxes in the collision events (FIGS. 5 and 6) are discernable from the spectral fluxes in the non-collision events (FIGS. 3 and 4). Likewise, the similarities between the spectral fluxes of the collision events are discernable (FIGS. 5 and 6).

Figure 7:
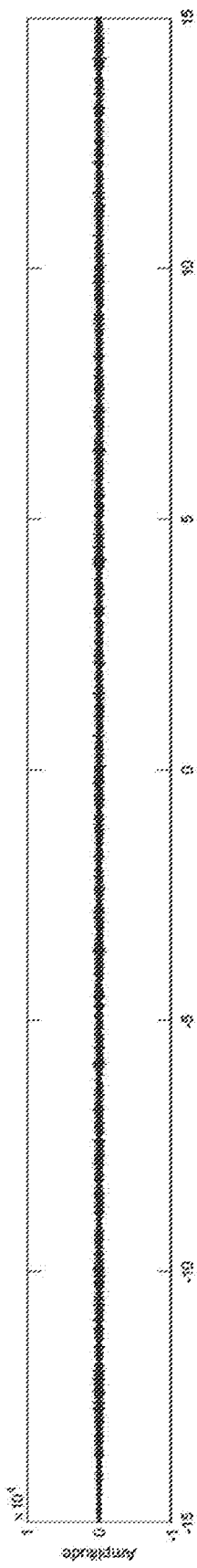
FIG. 7 is a line graph showing an example of a cross correlation between an exemplary sound wave received by the crash detection system and a template, corresponding with a 500 Hz sine wave.
Figure 8:
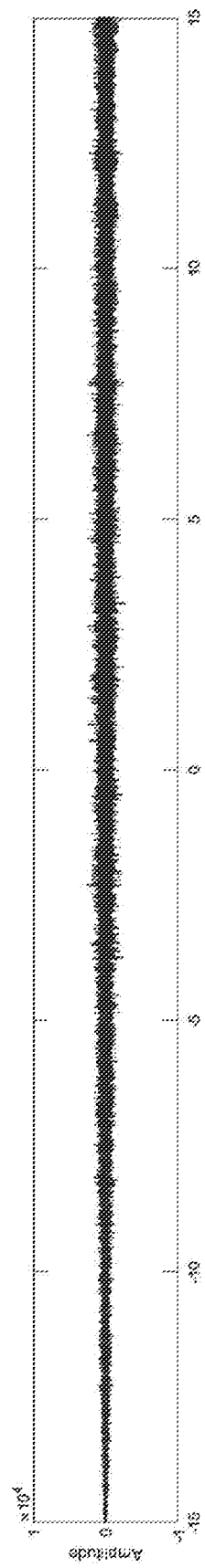
FIG. 8 is a line graph showing an example of a cross correlation between an exemplary sound wave received by the crash detection system and the template, corresponding with a song.
Figure 9:
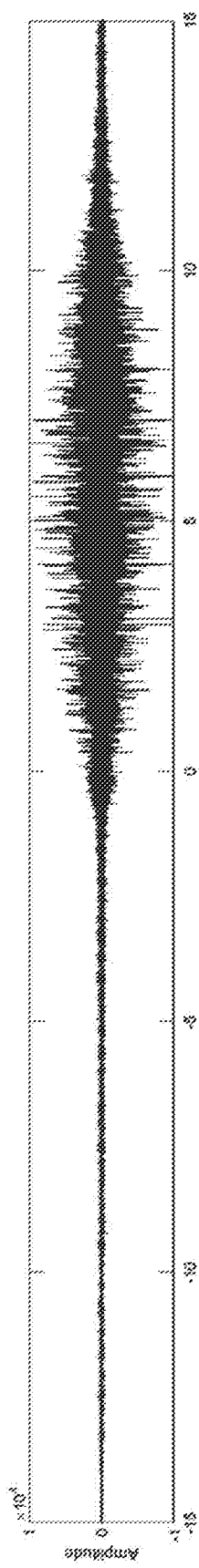
FIG. 9 is a line graph showing an example of a cross correlation between an exemplary sound wave received by the crash detection system and the template, corresponding with a corresponding with a 32 kph vehicle collision.
Figure 10:
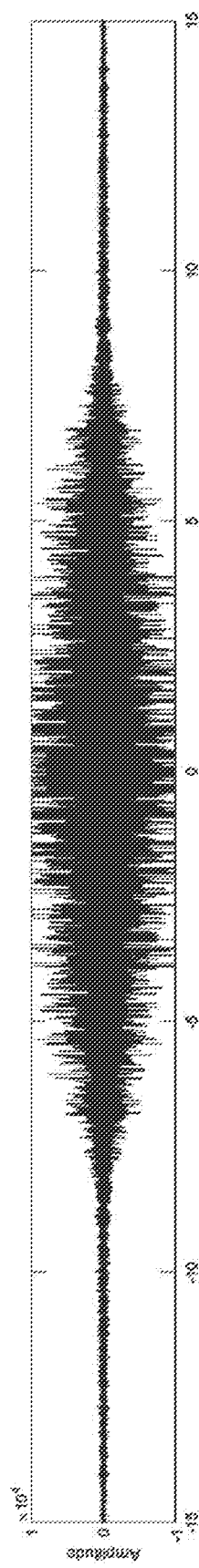
FIG. 10 is a line graph showing an example of a cross correlation between an exemplary sound wave received by the crash detection system and the template, corresponding with a corresponding with a 56 kph vehicle collision.

A cross-correlation may be calculated to compare and objectively determine how well a sound signal being recorded matches up with a pre-recorded collision profile. In particular, the cross-correlation shows at what point the best match occurs as shown in FIGS. 7-10. More specifically, FIG. 7 shows a cross correlation between an exemplary sound signal and a template, corresponding with a 500 Hz sine wave, where a low correlation can be observed between the 500 Hz sine wave and the template, further defined as a pre-stored collision curve. FIG. 8 shows a cross correlation between the exemplary sound signal and the template, corresponding with a song of the "metal" genre, where a low correlation can be observed between the song of the "metal" genre and the template, further defined as the pre-stored collision curve. FIG. 9 shows a cross correlation between the exemplary sound signal and the template, corresponding with a 32 kph collision, where a high correlation can be observed between the 32 kph collision sound wave and the template, further defined as the pre-stored collision curve. FIG. 10 shows a cross correlation between the exemplary sound signal and the template, corresponding with a 56 kph collision where a high correlation can be observed between the 56 kph collision sound wave and the template, further defined as the pre-stored collision curve. FIG. 10 shows the best match between the exemplary sound signal and the template. More specifically, the waves of the exemplary sound signal which correspond to a collision at 32 kph (FIG. 9) and at 56 kph (FIG. 10) have the highest correlation with a pre-learned crash profile, which can be updated continuously wirelessly, via the first and second antennas 32A, 32B. As such, the processor 28 can ascertain or distinguish that a collision occurring at approximately 32 kph or 56 kph has occurred, which may be helpful to inform the conditions which the collision occurred independently of any other vehicle subsystems, such as GNSS, speedometers, or other sensors present on the vehicle which may not be available or damaged as a consequence of the impacts of the collision As described above, the processor 28 is programmed to monitor properties of the sound waves within the sound signals and compare the properties to thresholds stored in the at least one non-transitory computer-readable medium 30. Multiple thresholds may be stored in order to correspond with different sounds that occur during a collision. More specifically, variables that occur during a collision, such as the speed of the vehicle 22 during the collision, the type of collision (e.g., front impact, side impact, rear impact, rollover, etc.), and what the vehicle 22 collides with (e.g., another vehicle, a guard rail, etc.) can produce differences in the sounds and the properties of the sounds (e.g., the gradient of the variance of the sound wave, a spectral flux of the sound wave, and the cross correlation analysis). Furthermore, the thresholds may be unique for each vehicle that the crash detection system 20 is utilized in. For example, the sounds produced during a collision may be different between different models (e.g., a compact car versus a full-size pickup truck) due to the mass of the vehicle 22, material of construction, layout of components, etc. The sounds produced during a collision may also be different for the same models having different configurations and options (e.g., a standard cab pickup truck versus a crew cab pickup truck).

As shown in FIG. 1, the crash detection system 20 may further comprise a primary collision indication system 38 comprising at least one of an accelerometer 40 and a navigation system 42 and configured to detect acceleration of the vehicle 22, with the primary collision indication system 38 in communication with the computational system 26 and powered by one of the first and second batteries 24A, 24B, and with the primary collision indication system 38 configured to send primary signals to the computational system 26 pertaining to the acceleration of the vehicle 22. The accelerometer 40 may be comprised of multiple accelerometers 40 spaced about the vehicle 22 and configured to detect the acceleration of the vehicle 22 from numerous angles and rotations that may occur in the many different types of collision events (as described above). Similarly, the navigation system 42 may comprise a navigation antenna 44 in electronic communication with the computational system 26, with the navigation antenna 44 configured to wirelessly communicate with a global navigation satellite system (GNSS) network 46. The processor 28 of the computational system 26 may be further programmed to communicate with the GNSS network 46 through the navigation antenna 44 to ascertain a location of the vehicle 22 and calculate an acceleration of the vehicle 22 through a change in the location relative to time. The processor 28 may be programmed to compare the acceleration to an acceleration threshold stored in the at least one non-transitory computer-readable medium 30, determine if the vehicle 22 has been involved in a collision if the acceleration crosses the respective acceleration threshold, and communicate with the external network 34 to report the collision with one of the first and second antennas 32A, 32B. The primary collision indication system 38 may comprise one or both of the accelerometer 40 and the navigation system 42. The primary collision indication system 38 may comprise other components (not described herein) to monitor changes in acceleration of the vehicle 22 or otherwise detect that the vehicle 22 has been involved in a collision. The accelerometer 40 and the navigation system 42 may independently or collectively monitor whether the vehicle 22 has been involved in a collision.

The processor 28 may be programmed to prioritize the primary signals over the sound signals and monitor the acceleration of the vehicle 22 within the primary signals.

More specifically, the processor 28 may rely upon the primary signals for determining that the vehicle 22 has been in a collision. The processor 28 may be further programmed to determine if the primary signals are present, prioritize the sound signals if the primary signals are not present, and monitor the properties of the sound waves within the sound signals. More specifically, if the processor 28 cannot establish communication with the primary collision indication system 38, the processor 28 may then utilize the microphone 36 (which is connected directly to the computational system 26 and independent of the rest of the vehicle 22) and the sound signals for detecting a collision. In one example, the accelerometer 40 detects the collision first, with the navigation system 42 following the accelerometer 40 as a backup to detect the collision, and with the microphone 36 detecting the collision acting as a second backup to detect the collision. However, the components of the primary collision indication system 38 may be utilized in any suitable manner and order for detecting a collision. Furthermore, the primary collision indication system 38 and the microphone 36 may be utilized in any suitable manner and order for detecting a collision. It is further to be appreciated that the microphone 36 in electronic communication with the processor 28 may be the sole manner of detecting that the vehicle 22 has been in a collision.

The first battery 24A may be further defined as a vehicle battery configured to power the entire vehicle 22 and the first antenna 32A may be further defined as a vehicle cellular antenna configured to provide wireless communication with the external network 34 for the entire vehicle 22. The second battery 24B and the second antenna 32B may be further defined as a backup battery and a backup cellular antenna, respectively, and independently connected to the computational system 26. The backup battery is configured to power the computational system 26 if power from the vehicle battery is lost from the computational system 26. The backup cellular antenna is configured to provide wireless communication with the external network 34 for the computational system 26 if the electronic communication between the computational system 26 and the vehicle cellular antenna is lost. More specifically, during a collision power may be lost from the first battery 24A and/or communication with the first antenna 32A may be lost for numerous reasons, including physically breaking the wire connections therebetween due to the forces exerted on the vehicle 22 during the collision. As such, the second battery 24B and the second antenna 32B establish a backup by which the processor 28 may communicate with the external network 34 to report that the vehicle 22 has been in a collision. In one example, the first antenna 32A is prioritized to wirelessly communicate with the external network 34 and the first battery 24A is prioritized to provide power to the first antenna 32A, the primary collision indication system 38, the microphone 36, and the computational system 26. The second battery 24B powers the first antenna 32A, the primary collision indication system 38, the microphone 36, and the computational system 26 if power is lost from the first battery 24A. The first battery 24A powers the second antenna 32B, the primary collision indication system 38, the microphone 36, and the computational system 26 if electronic communication between the computational system 26 and the first antenna 32A is lost. The second battery 24B powers the second antenna 32B, the microphone 36, and the computational system 26 if power is lost from the first battery 24A and electronic communication between the computational system 26 and the first antenna 32A is lost. More specifically, if power is lost from the first battery 24A and electronic communication between the computational system 26 and the first antenna 32A is lost, the computational system switches from utilizing the primary collision indication system 38 to utilizing the sounds of the collision received by the microphone 36 for determining in the vehicle 22 has been in a collision.

Alternatively, the first antenna 32A, the primary collision indication system 38, the microphone 36, and the computational system 26 may be arranged to be powered by the first battery 24A. The second antenna 32B, the microphone 36, and the computational system 26 are arranged to be powered by the second battery 24B. The first and second antennas 32A, 32B are configured to independently wirelessly communicate with the external network 34. The processor 28 is programmed to determine if electronic communication with the first antenna 32A is available and communicate with the external network 34 to report the collision using the second antenna 32B if the first antenna 32A is not available. More specifically, if the processor 28 losses connection with the first battery 24A and/or the first antenna 32A, the primary collision indication system becomes inoperable. Likewise, the processor 28 may not utilize the sound signals from the microphone 36 and contact the external network 34 through the first antenna 32A if connection with the first battery 24A and/or the first antenna 32A is lost. As such, in the event that power is lost from the first battery 24A and/or electronic communication is lost with the first antenna 32A, the processor 28 switches to being power exclusively by the second battery 24B and communicating with the external network 34 exclusively with the second antenna 32B. Furthermore, in this example the sound signals from the microphone 36 become the exclusive manner of detecting a collision.

In the example shown in FIG. 1, the at least one processor 28 is further defined as a first processor 28A and a second processor 28B. Likewise, the at least one non-transitory computer-readable medium 30 is further defined as a first non-transitory computer-readable medium 30A and a second non-transitory computer-readable medium 30B. The microphone 36 may be further defined as a first microphone 36A and a second microphone 36B. The first processor 28A and the first microphone 36A are electronically connected to the first antenna 32A and the primary collision indication system 38, and are powered by the first battery 24A. The second processor 28B and the second microphone 36B are electronically connected to the second antenna 32B and are powered by the second battery 24B. The first processor 28A and the first microphone 36A may be part of the vehicle control unit, with the first microphone 36A configured as the occupant microphone and with the first processor 28A communicating with the primary collision indication system 38. On the other hand, the second processor 28B and the second microphone 36B are configured as a backup processor and a backup microphone. While the second microphone 36B may be configured as the occupant microphone, the second microphone 36B is configured to receive sounds when powered by the second battery 24B (i.e., when power from the first battery 24A is lost). Accordingly, the second battery 24B, the second antenna 32B, the second processor 28B, and the second microphone 36B may be configured as modular and self-sustaining backup system that may detect when a collision has occurred from the sound waves received in the second microphone 36B, even if failures occur within the standard vehicle systems (i.e., the first battery 24A, the first antenna 32A, the first processor 28A, the first microphone 36A, and the primary collision indication system 38.

Figure 11:
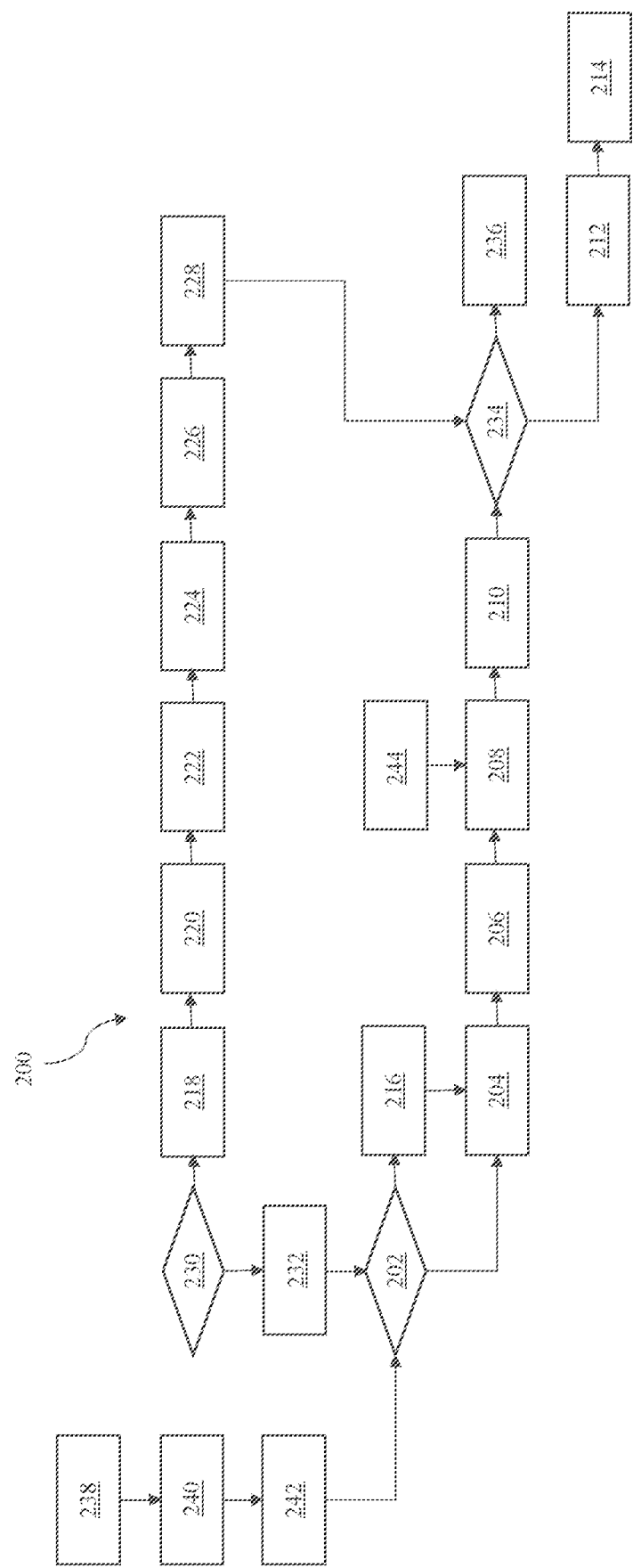
FIG. 11 is a flow chart showing a method of operating the crash detection system.

A method 200 of operating the operating the crash detection system 20 is also disclosed herein and shown in FIG. 11. The method comprises receiving the sound waves continuously and in real time with the microphone 36 (see box 202), transmitting the sound signals corresponding to the sound waves to the processor 28 (see box 204), and monitoring the properties of the sound waves within the sound signals with the processor 28 (see box 206). The method further comprises comparing the properties to thresholds stored in the at least one non-transitory computer-readable medium 30 (see box 208), determining if the vehicle 22 has been involved in a collision if at least one of the properties crosses the respective threshold (see box 210), communicating wirelessly with the external network 34 with one of the first and second antennas 32A, 32B (see box 212), and reporting the collision to the external network 34 (see box 214). Monitoring properties of the sound waves within the sound signals with the processor 28 may be further defined as monitoring at least one of the gradient of the variance of the sound wave, the spectral flux of the sound wave, and the cross-correlation analysis within the sound signals with the processor 28.

The method 200 may further comprise adjusting the gain of the microphone 36 to accommodate the sound waves (see box 216), after receiving the sound waves with the microphone 36 (see box 202). As described above, the microphone 36 may further defined as the occupant microphone, with the sound waves comprising speech from the occupant of the vehicle 22 and collision sounds. The method of adjusting the gain of the microphone 36 to accommodate the sound waves may be further defined as lowering the gain to receive the sound waves of the collision sounds and increasing the gain to receive the sound waves of the speech.

As described above, the crash detection system 20 may further comprise the primary collision indication system 38 comprising at least one of the accelerometer 40 and the navigation system 42, with the primary collision indication system 38 in communication with the computational system 26 and configured to send primary signals to the computational system 26 pertaining to the acceleration of the vehicle 22. The method may further comprise detecting the acceleration of the vehicle 22 with the primary collision indication system 38 (see box 218), sending the primary signals to the computational system 26 pertaining to the acceleration of the vehicle 22 (see box 220), and prioritizing the primary signals over the sound signals with the processor 28 (see box 222). The method may further comprise monitoring the acceleration of the vehicle 22 within the primary signals with the processor 28 (see box 224), comparing the acceleration to the acceleration threshold stored in the at least one non-transitory computer-readable medium 30 with the processor 28 (see box 226), determining if the vehicle 22 has been involved in a collision if the acceleration crosses the respective acceleration threshold with the processor 28 (see box 228), and communicating wirelessly with the external network 34 with one of the first and second antennas 32A, 32B (see box 212), and reporting the collision to the external network (see box 214).

In another aspect, the method further comprises determining if the primary signals are present with the processor 28 (see box 230), prioritizing the sound signals if the primary signals are not present with the processor 28 (see box 232), and monitoring the properties of the sound waves within the sound signals with the processor 28 (see box 206).

The method may further comprise determining if electronic communication with the first antenna 32A is available (see box 234) and communicating with the external network 34 to report the collision using the second antenna 32B if the first antenna 32A is not available (see box 236). The method may also comprise powering the first antenna 32A, the primary collision indication system 38, the microphone 36, and the computational system 26 with the first battery 24A (see box 238), losing continuity with the first battery 24A (see box 240), and powering the first antenna 32A, the microphone 36, and the computational system 26 with the second battery 24B (see box 242).

The method may further comprise updating the thresholds stored in the at least one non-transitory computer-readable medium 30 (see box 244) prior to comparing the properties to thresholds stored in the at least one non-transitory computer-readable medium 30 (see box 208). More specifically, thresholds (i.e., crash profiles in pre-learned crash curves) that indicate that a collision has occurred may be added or updated continuously over the life of the vehicle based upon new data and research received by the manufacturer in order to continuously improve the crash detection system 20. Updating the thresholds may be performed be wirelessly by receiving the data from an external communication source (such as a satellite or cell tower) through the first antenna 32A and/or the second antenna 32B, which can be powered by the first battery 24A and/or the second battery 24B. Updating the thresholds may also be performed by a wired connection to the vehicle (e.g., by a technician at a vehicle service center). Furthermore, the thresholds may be stored in an electronic cloud service and compared in real tie with the sounds captured by the microphone 36.

Accordingly, the crash detection system 20 and the corresponding method 200 offer several advantages. The use of the microphone 36 and the computational system 26 to receive and interpret the sound waves to determine if the vehicle 22 has been in a collision, and the corresponding communication with external network 34 creates another manner of obtaining assistance for occupants involved a vehicle collision. The crash detection system 20 may be utilized with other systems (e.g., the primary collision indication system 38) for detecting that the vehicle 22 has been involved in a collision, serving as a primary or backup system. Furthermore, the use of the second battery 24B and the second antenna 32B with the microphone 36 and the processor 28 separates provides a robust backup system to facilitate communication with the external network 34 in the event that power from the first battery 24A and/or communication with the first antenna 32A is lost.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A crash detection system for use with a vehicle, the crash detection system comprising:
   a first battery and a second battery;
   a computational system powered by one of the first and second batteries and comprising at least one processor and at least one non-transitory computer-readable medium including instructions;
   a first antenna and a second antenna both in electronic communication with the computational system and powered by one of the first and second batteries, with the first and second antennas configured to independently wirelessly communicate with an external network; and a microphone powered by one of the first and second batteries and in electronic communication with the computational system, with the microphone configured to continuously receive sound waves in real time and transmit sound signals corresponding to the sound waves to the processor, wherein the microphone is further defined as an occupant microphone and the sound waves comprise speech from an occupant of the vehicle and collision sounds;

wherein the processor is programmed to:
  monitor properties of the sound waves within the sound signals;
  adjust a gain of the microphone, with the processor lowering the gain to receive the sound waves of the collision sounds and increasing the gain to receive the sound waves of the speech;
  compare the properties to thresholds stored in the at least one non-transitory computer-readable medium;
  determine that the vehicle has been involved in a collision when at least one of the properties crosses the respective threshold; and
  communicate with the external network to report the collision with one of the first and second antennas.

2. The crash detection system of claim 1, wherein the first battery is further defined as a vehicle battery configured to power the entire vehicle and the first antenna is further defined as a vehicle cellular antenna configured to provide wireless communication with the external network for the entire vehicle, with the second battery and second antenna further defined as a backup battery and a backup cellular antenna, respectively, and independently connected to the computational system, with the backup battery configured to power the computational system when power from the vehicle battery is lost from the computational system and with the backup cellular antenna configured to provide wireless communication with the external network for the computational system when the electronic communication between the computational system and the vehicle cellular antenna is lost.

3. The crash detection system of claim 1, wherein the processor being programmed to monitor the properties of the sound waves within the sound signals is further defined as the processor being programmed to monitor at least one of a gradient of a variance of the sound wave, a spectral flux of the sound wave, and a cross correlation analysis.

4. The crash detection system of claim 1, further comprising a primary collision indication system comprising at least one of an accelerometer and a navigation system and configured to detect acceleration of the vehicle, with the primary collision indication system in communication with the computational system and powered by one of the first and second batteries, and with the primary collision indication system configured to send primary signals to the computational system pertaining to the acceleration of vehicle, with the processor programmed to:
  prioritize the primary signals over the sound signals;
  monitor the acceleration of the vehicle within the primary signals;
  compare the acceleration to an acceleration threshold stored in the at least one non-transitory computer-readable medium;
  determine that the vehicle has been involved in a collision when the acceleration crosses the respective acceleration threshold; and
  communicate with the external network to report the collision with one of the first and second antennas.

5. The crash detection system of claim 4, wherein the processor is further programmed to:
  determine when the primary signals are present;
  prioritize the sound signals when the primary signals are not present; and
  monitor the properties of the sound waves within the sound signals.

6. The crash detection system of claim 5, wherein the first antenna is prioritized to wirelessly communicate with the external network and wherein the first battery is prioritized to provide power to the first antenna, the primary collision indication system, the microphone, and the computational system;
  wherein the second battery powers the first antenna, the primary collision indication system, the microphone, and the computational system when power is lost from the first battery;
  wherein the first battery powers the second antenna, the primary collision indication system, the microphone, and the computational system when electronic communication between the computational system and the first antenna is lost; and
  wherein the second battery powers the second antenna, the microphone, and the computational system when power is lost from the first battery and electronic communication between the computational system and the first antenna is lost.

7. The crash detection system of claim 4, wherein the navigation system comprises a navigation antenna in electronic communication with the computational system, with the navigation antenna configured to wirelessly communicate with a global navigation satellite system (GNSS) network.

8. The crash detection system of claim 7, wherein the processor of the computational system is further programmed to:
  communicate with the GNSS network through the navigation antenna to ascertain a location of the vehicle;
  calculate an acceleration of the vehicle through a change in the location relative to time;
  compare the acceleration to an acceleration threshold stored in the at least one non-transitory computer-readable medium;
  determine that the vehicle has been involved in a collision when the acceleration crosses the respective acceleration threshold; and
  communicate with the external network to report the collision.

9. A method of operating a crash detection system for use with a vehicle, with the crash detection system comprising a first battery and a second battery, a computational system powered by one of the first and second batteries and comprising at least one processor and at least one non-transitory computer-readable medium including instructions, a first antenna and a second antenna both in electronic communication with the computational system and powered by one of the first and second batteries, a primary collision indication system comprising at least one of an accelerometer and a navigation system, with the primary collision indication system in communication with the computational system and configured to send primary signals to the computational system pertaining to the acceleration of vehicle, and a microphone powered by one of the first and second batteries and in electronic communication with the computational system, the method comprising:

receiving sound waves continuously and in real time with the microphone;

transmitting sound signals corresponding to the sound waves to the processor;

monitoring properties of the sound waves within the sound signals with the processor;

comparing the properties to thresholds stored in the at least one non-transitory computer-readable medium;

determining that the vehicle has been involved in a collision when at least one of the properties crosses the respective threshold;

detecting an acceleration of the vehicle with the primary collision indication system;

sending primary signals to the computational system pertaining to the acceleration of vehicle;

prioritizing the primary signals over the sound signals with the processor;

monitoring the acceleration of the vehicle within the primary signals with the processor;

determining when the primary signals are present with the processor;

prioritizing the sound signals when the primary signals are not present with the processor;

monitoring the properties of the sound waves within the sound signals with the processor;

comparing the acceleration to an acceleration threshold stored in the at least one non-transitory computer-readable medium with the processor;

determining that the vehicle has been involved in a collision when the acceleration crosses the respective acceleration threshold with the processor;

communicating wirelessly with an external network with one of the first and second antennas when the acceleration crosses the respective acceleration threshold or when one of the properties of the sound wave crosses the respective threshold; and reporting the collision to the external network.

10. The method of claim 9, wherein monitoring properties of the sound waves within the sound signals with the processor is further defined as monitoring at least one of a gradient of a variance of the sound wave, a spectral flux of the sound wave, and a cross correlation analysis within the sound signals with the processor.

11. The method of claim 9, further comprising adjusting a gain of the microphone to accommodate the sound waves, after receiving the sound waves with the microphone.

12. The method of claim 11, wherein the microphone is further defined as an occupant microphone, with the sound waves comprising at least speech from an occupant of the vehicle and collision sounds, wherein adjusting a gain of the microphone to accommodate the sound waves is further defined as lowering the gain to receive the sound waves of the collision sounds and increasing the gain to receive the sound waves of the speech.

13. The method of claim 9, the method further comprising:

determining when electronic communication with the first antenna is available; and communicating wirelessly with the external network with the second antenna when the first antenna is not available.

14. The method of claim 13, further comprising:

powering the first antenna, the primary collision indication system, the microphone, and the computational system with the first battery;

losing continuity with the first battery; and powering the first antenna, the microphone, and the computational system with the second battery.

15. The method of claim 9, further comprising updating the thresholds stored in the at least one non-transitory computer-readable medium prior to comparing the properties to thresholds stored in the at least one non-transitory computer-readable medium.

16. A method of operating a crash detection system for use with a vehicle, with the crash detection system comprising a first battery and a second battery, a computational system comprising at least one processor and at least one non-transitory computer-readable medium including instructions, a first antenna and a second antenna both in electronic communication with the computational system and powered by one of the first and second batteries, and a microphone in electronic communication with the computational system for receiving sound waves, wherein the microphone is further defined as an occupant microphone, with the sound waves comprising at least speech from an occupant of the vehicle and collision sounds, the method comprising:

powering the first antenna, the primary collision indication system, the microphone, and the computational system with the first battery;

losing continuity with the first battery;

powering the first antenna, the microphone, and the computational system with the second battery;

receiving the sound waves continuously and in real time with the microphone;

adjusting a gain of the microphone to accommodate the sound waves by lowering the gain to receive the sound waves of the collision sounds and increasing the gain to receive the sound waves of the speech;

transmitting sound signals corresponding to the sound waves to the processor;

monitoring properties of the sound waves within the sound signals with the processor;

comparing the properties to thresholds stored in the at least one non-transitory computer-readable medium;

determining that the vehicle has been involved in a collision when at least one of the properties crosses the respective threshold;

communicating wirelessly with an external network with the first antenna; and reporting the collision to the external network.

* * * * *